(No Model.)

J. T. CLARKSON.
JUMP SEAT CARRIAGE.

No. 324,232. Patented Aug. 11, 1885.

Witnesses
Ralph E. Clarkson
Robert L. Reid

Inventor:
Joseph T. Clarkson

UNITED STATES PATENT OFFICE.

JOSEPH T. CLARKSON, OF AMESBURY, MASSACHUSETTS.

JUMP-SEAT CARRIAGE.

SPECIFICATION forming part of Letters Patent No. 324,232, dated August 11, 1885.

Application filed February 15, 1884. (No model.)

*To all whom it may concern:*

Be it known that I, JOSEPH T. CLARKSON, a citizen of the United States, residing at Amesbury, in the county of Essex and State of Massachusetts, have invented a new and useful Improvement in Jump-Seat Carriages, of which the following is a specification.

This invention has for its object certain improvements in jump-seat carriages, and it will, in connection with the accompanying drawings, be hereinafter fully described, and defined in the appended claims.

Figure 1:
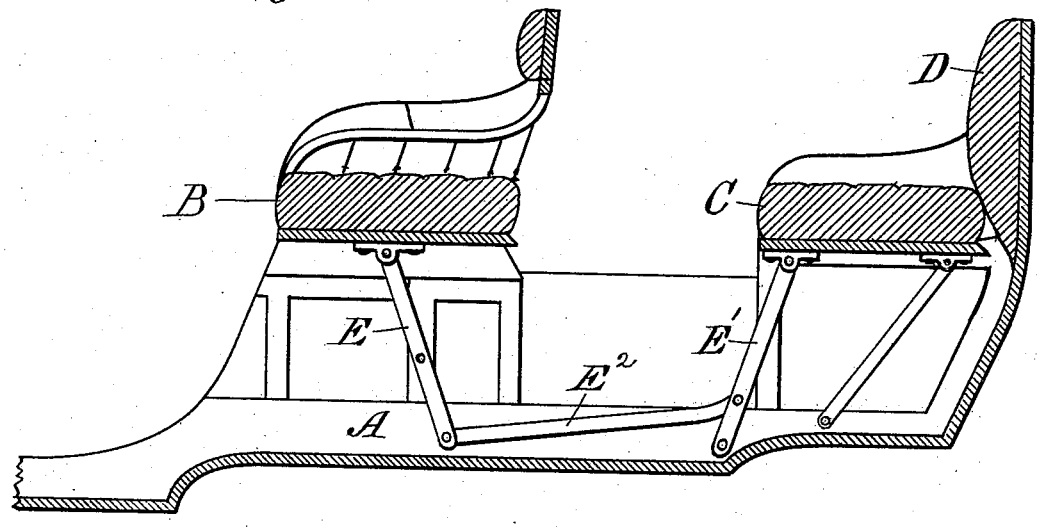
Figure 2:
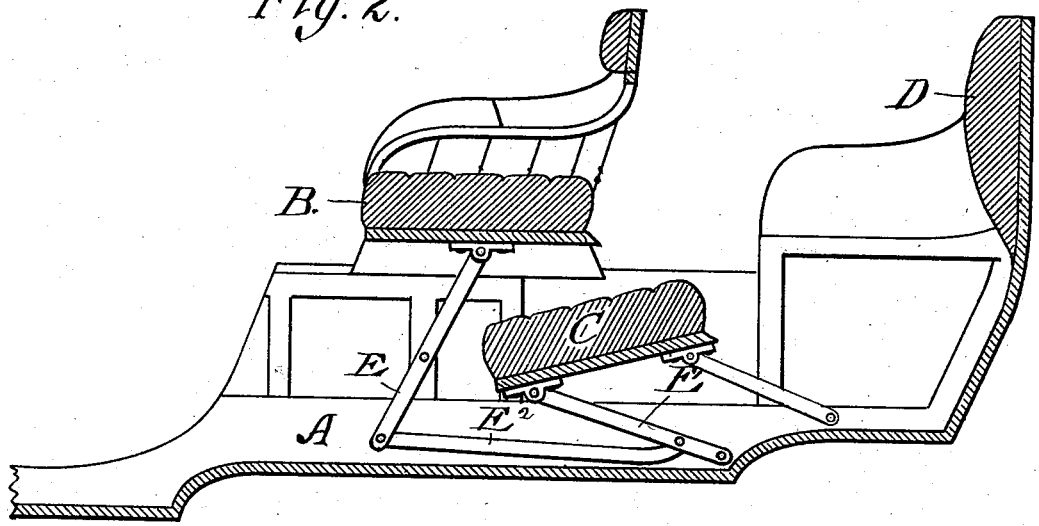

In said drawings, Figure 1 is a sectional elevation of a carriage embodying my invention, the section being vertical and taken longitudinally through the body, as when both seats are in position for use. Fig. 2 is a view like Fig. 1, but showing the front seat as jumped to a rearward position to serve as the sole seat of the vehicle, and the rear seat as dismounted or lowered from the position shown in Fig. 1.

In said views, A represents the body, B the front seat, and C the rear seat, each of which may be of any desired style or pattern, adapted for use together, as combined and arranged in my invention.

A lever-like jumping-iron, E, is at its upper end pivoted to said seat B, while it is, near its lineal center, pivoted to a standard of the side panel-frame of body A, said lever serving as a jumping-iron, upon which the front seat is changed from the position shown in Fig. 1 to that in Fig. 2, and vice versa. The rear seat, C, is pivotally connected with the body by jumping-irons, the front one of which is marked E', and is connected with lever E by a connecting-rod, E², which at its rear end is pivoted to E' above its lower pivot, while its front end is pivoted to lever E at the lower end thereof. By this arrangement of parts the movement of seat B from the position in Fig. 1 to that in Fig. 2, where it serves as the sole seat of the carriage, will automatically change the position of seat C from that shown in Fig. 1 to that shown in Fig. 2, and the reverse movement of the front seat brings the rear seat back to that shown in Fig. 1 for use. The back D of body A serves as the back of seat C when the latter is in position, as shown in Fig. 1, while seat B is formed with a high permanent back, as shown. By thus arranging the rear seat to serve as the casual seat, to be dismounted or folded away when it is desired to convert the vehicle into a one-seat carriage, while the front seat is permanently in position for use, either as the front seat of a two-seated vehicle, or as the sole seat when a single-seated vehicle is desired, which arrangement is the reverse of that hitherto known, I am enabled to provide a high-standing back for each seat, as the back D of the body furnishes such a back for the rear seat whenever it is in position for use, while the front seat, B, is constructed with such a high-standing back as an integral part thereof, which would be practically impossible if said front seat was arranged to serve as the transient seat, and to turn down when but one seat was to be employed, as in that event if a high back was desired it could only be provided with a pivoted or folding "lazy-back;" and, further, the front seat may be of the full width permitted by that of body A.

It will be obvious that instead of the supporting and jumping irons shown others adapted to perform the functions thereof may be substituted in their stead.

I claim as my invention—

1. The combination, with a front seat provided with requisite devices and arranged to be jumped to a forward position to serve as the front seat of the vehicle, and to be jumped to a central position to serve as the sole seat of the vehicle, of a rear seat adapted and arranged to be automatically operated by connecting-rods from the front seat, substantially as specified.

2. The combination, with a seat capable of being arranged in a forward position to serve as the front seat of the vehicle, and also in a central position to serve as the sole seat of the vehicle, of a seat capable of being arranged to serve as a rear seat when the front seat is in a forward position, and to be dismounted or lowered when said forward seat is centrally arranged to serve as the sole seat, substantially as specified.

3. The combination, with the front and rear seats capable of being arranged as specified, of a body-back constructed and arranged to serve as the back of the rear seat when in position for use, substantially as specified.

4. The combination of seat B, arranged to be jumped to and utilized in either a front or central position, seat C, adapted to be arranged and utilized in a rear position and to be dismounted or lowered when the front seat is in a central position, and body-back D, adapted to serve as the back of said seat C when it is in position for use, substantially as specified.

JOSEPH T. CLARKSON.

Witnesses:
FRANK R. WHITCHER,
GEORGE H. BRIGGS.